US009307467B2

(12) United States Patent
Balakrishnan et al.

(10) Patent No.: US 9,307,467 B2
(45) Date of Patent: Apr. 5, 2016

(54) NETWORK RESELECTION FOR A WIRELESS COMMUNICATION DEVICE

(71) Applicant: Apple Inc., Cupertino, CA (US)

(72) Inventors: Swaminathan Balakrishnan, Sunnyvale, CA (US); Sarma V. Vangala, San Jose, CA (US); Wanping Zhang, San Jose, CA (US); Tahir Shamim, San Jose, CA (US); Sreevalsan Vallath, Dublin, CA (US)

(73) Assignee: Apple Inc., Cupertino, CA (US)

( * ) Notice: Subject to any disclaimer, the term of this patent is extended or adjusted under 35 U.S.C. 154(b) by 93 days.

(21) Appl. No.: 14/012,934

(22) Filed: Aug. 28, 2013

(65) Prior Publication Data

US 2014/0066055 A1 Mar. 6, 2014

Related U.S. Application Data

(60) Provisional application No. 61/694,209, filed on Aug. 28, 2012.

(51) Int. Cl.
*H04W 36/14* (2009.01)
*H04W 48/18* (2009.01)

(52) U.S. Cl.
CPC .............. *H04W 36/14* (2013.01); *H04W 48/18* (2013.01); *Y02B 60/50* (2013.01)

(58) Field of Classification Search
CPC ....... H04W 36/14; H04W 48/18; Y02B 60/50
USPC ........ 455/434, 435.2, 435.3, 433, 436, 432.3, 455/552, 415, 426, 422, 452.1, 509, 557, 455/432.1–444, 512, 513; 370/311, 328, 370/331–338
See application file for complete search history.

(56) References Cited

U.S. PATENT DOCUMENTS 6,415,148 B1  7/2002  Chiniga et al.
6,934,544 B2 * 8/2005  Cooper ................. H04W 48/18
                                                           455/435.2

(Continued)

OTHER PUBLICATIONS

Penttinen, J. T. J. and Jalkanen, T. (2011) Functionality of LTE/SAE, in the LTE/SAE Deployment Handbook (ed J. T. J. Penttinen), John Wiley & Sons, Ltd, Chichester, UK. doi: 10.1002/9781119954187. ch10.*

(Continued)

*Primary Examiner* — Sharad Rampuria
(74) *Attorney, Agent, or Firm* — Downey Brand LLP

(57) ABSTRACT

A network reselection procedure, of a wireless communication device, that occurs following a network detachment event, such as a device sleep event or a device power savings mode event. The wireless communication device attempts to acquire a first wireless network to which the wireless communication device was most recently attached, immediately preceding the network detachment event. Then, in response to an unsuccessful acquisition of the first wireless network, the wireless communication device attempts an alternate network acquisition utilizing a Most Recently Used List (MRUL) that is stored at the wireless communication device and includes information about one or more frequency bands allocated to a primary service provider with which the wireless communication device is affiliated. After determining whether the alternate network acquisition attempt was successful, the wireless communication device attaches to a second network and stores information associated with the second network.

18 Claims, 7 Drawing Sheets

(56) References Cited

U.S. PATENT DOCUMENTS

| | | | | |
|---|---|---|---|---|
| 8,068,834 B2* | 11/2011 | Amerga et al. | | 455/436 |
| 8,073,441 B1* | 12/2011 | Unger et al. | | 455/422.1 |
| 8,270,967 B1* | 9/2012 | Goyal | H04W 48/18 | 455/432.1 |
| 8,364,142 B1* | 1/2013 | Berberian | H04W 48/16 | 370/332 |
| 8,798,590 B2* | 8/2014 | Vashi et al. | | 455/414.1 |
| 2004/0219916 A1* | 11/2004 | Kim | H04W 48/18 | 455/435.3 |
| 2007/0142046 A1* | 6/2007 | Welnick | H04W 48/16 | 455/434 |
| 2007/0275719 A1 | 11/2007 | Lee et al. | | |
| 2008/0102825 A1 | 5/2008 | Joo | | |
| 2009/0075650 A1* | 3/2009 | Jung | H04W 48/16 | 455/432.3 |
| 2010/0075671 A1* | 3/2010 | Kubo | | 455/434 |
| 2010/0267383 A1* | 10/2010 | Konstantinou | H04W 48/18 | 455/435.2 |
| 2010/0291924 A1 | 11/2010 | Antrim et al. | | |
| 2010/0297995 A1* | 11/2010 | Macias et al. | | 455/435.2 |

OTHER PUBLICATIONS

Pérez-Romero, J., Salient, O., Agustí, R. and Díaz-Guerra, M. A. (2005) RRM Algorithms, in Radio Resource Management Strategies in UMTS, John Wiley & Sons, Ltd, Chichester, UK. doi: 10.1002/0470022795.ch5.*

* cited by examiner

NETWORK RESELECTION FOR A WIRELESS COMMUNICATION DEVICE

CROSS-REFERENCE TO RELATED APPLICATIONS

This application claims priority to U.S. Provisional Patent Application No. 61/694,209, filed on Aug. 28, 2012, the content of which is incorporated herein by reference in its entirety.

FIELD OF THE TECHNOLOGY

The described embodiments generally relate to wireless communications and more particularly to network reselections for a wireless communication device.

BACKGROUND

Fourth generation (4G) cellular networks employing newer radio access technology (RAT) systems that implement the $3^{rd}$ Generation Partnership Project (3GPP) Long Term Evolution (LTE) and LTE Advanced standards, are rapidly being developed and deployed within the United States and abroad. These deployments are being made in attempt to accommodate for an ever-increasing demand for Internet Protocol (IP) data communications, which is a natural consequence of the exponential growth of the personal computing device market, in conjunction with the increasing popularity of numerous social networking and media content provider services that are available over the Internet.

Networks utilizing these newer RATs often support significantly higher data rate throughputs, as compared to the throughput capabilities of preexisting cellular networks employing legacy RATs, such as third generation (3G) Universal Mobile Telecommunications System (UMTS)/High Speed Packet Access (HSPA) systems, 3G Code Division Multiple Access (CDMA) 2000/1× Evolution-Data Only (1× or EV-DO) systems, as well as second generation (2G) Global System for Mobile Communications (GSM)/Enhanced Data Rate for GSM Evolution (EDGE) systems.

In some 4G deployments, LTE and other newer RATs may not be adapted to fully support certain services that are supported by predecessor 2G and 3G legacy networks. Accordingly, many modern LTE networks are co-deployed within overlapping network topologies, alongside of other legacy networks. In these heterogeneous network environments, consumer wireless communication devices can transition between different RATs as communications services and/or network coverage may require.

For example, some LTE networks may not be capable of supporting voice calls via voice over LTE (VoLTE). Accordingly, when a wireless communication device receives or initiates a voice call communication, while connected to a 4G network that only supports IP data transfers, but not voice calls, the wireless communication device can perform a circuit switched fallback (CSFB) procedure in order to transition back to a 2G or 3G legacy network that supports voice calls. Further, when a wireless communication device that is engaged in a VoLTE communication session exits or roams beyond a corresponding LTE coverage area, the device may perform one or more single radio voice call continuity (SRVCC) functions to effectuate a smooth transition back to an available 2G or 3G legacy network.

Alternatively, when a wireless communication device attempts to send or receive IP data, while connected to a 2G or a 3G legacy network that is not capable of, or poorly equipped for, supporting the IP data transfer session's bandwidth requirement, the wireless communication device can perform a forward handover to a more capable 4G network. By way of example, this scenario may occur at a time when an LTE network becomes available to and/or is detected by the wireless communication device during the current packet-based communication session.

Additionally, when a wireless communication device transitions between and amongst different geographic regions associated with multiple, different cellular network providers that may employ a variety of proprietary 2G, 3G, and/or 4G RATs, the wireless communication device needs to identify available communications services to determine a most appropriate network to attach to, or camp on. By establishing an appropriate network attachment, the wireless communication device can conduct a voice call and/or an IP data transfer session via a corresponding circuit switched (CS) or a packet switched (PS) communication, or both. To effectuate network selection or reselection procedures while roaming, the 3GPP has standardized use of a public land mobile network (PLMN) list, and the 3GPP2 standards body has similarly implemented a preferred roaming list (PRL). A wireless communication device can employ a PLMN list or a PRL to readily identify which available cellular networks are roaming partners of a particular cellular network provider to which a user of the wireless communication device is subscribed, i.e., its carrier network.

At a time when a wireless communication device is powered up or is otherwise attempting an initial connection to an available network, or during any of the above described network handover scenarios, the wireless communication device may attempt to perform a full network scan over various assigned RAT frequency bands that may be allocated to its carrier, its carrier's roaming partner(s), and/or one or more unaffiliated network service providers. These extensive network searches can take a considerable amount of time and may only be practically feasible when a wireless device is first powered on or is roaming in an unfamiliar geographic region, as indicated by the geographic index information stored in the wireless communication device's PLMN list or the PRL.

For example, in a scenario where a 4G multi-mode wireless communication device attempts to locate an available LTE network, the device may perform an initial system scan over various known LTE frequency bands, e.g., bands within the 700 MHz, 1700 MHz and 2100 MHz mobile spectrum, to try tune to an available LTE network. However, when no corresponding LTE networks are detected during a first portion of the scan, the device may subsequently attempt to scan various known 3G legacy frequency bands, e.g., bands within the 850 MHz and 1900 MHz mobile spectrum, to attempt to tune to an available HSPA+ or EV-DO network during a second portion of the scan. Likewise, if the 3G legacy scan were also unsuccessful, the device may attempt a scan of various 2G legacy frequency bands to try to tune to an available EDGE network during a third portion of the scan.

In other scenarios, where a wireless communications device has recently camped on one or more wireless networks within a certain geographic area, historical network information about these known systems can be stored within a temporary memory or cache storage area of the wireless communication device known as a most recently used list (an MRU or MRUL). The device's MRUL may comprise a short listing of one or more network systems to which the wireless communication device was most recently attached. The MRUL can allow the device to readily identify familiar networks during a short-listed frequency scan procedure.

However, most MRULs are carrier-generic. As such, these lists often indiscriminately maintain identifying information about each one of a limited number networks that a wireless communication device has previously camped on. For instance, an MRUL may include only basic identifying information about a limited number of networks that include one or more preferred roaming partner networks. Each time the wireless communication device attaches to a new network, it may update the MRUL by adding information about the latest network attachment to the MRUL. At the same time the latest network attachment information is added to the MRUL, the last-used network system (i.e., the system at the end of a full MRUL) may be systematically removed from the MRUL, or pushed out of the MRUL in order to make room for the new entry.

As MRULs are often indiscriminately maintained, they can include network system information pertaining to both a home carrier network and multiple roaming networks, which are collectively associated with multiple, differing frequency spectra. For instance, an MRUL may include information associated with diversified frequency spectra for multiple carriers; this diversified composite would not facilitate a quick scan of a relatively small number of frequency resources associated with a designated carrier, prior to resorting to extended frequency band scans for multiple roaming networks. Consequently, MRULs often inefficiently include some of the very same frequency and channel information that exists in a device's PLMN list or PRL. Not only can this result in redundant frequency band searches, but it may significantly increase the timing requirements associated with performing compact MRUL scans.

Accordingly, there remains a need for generating and maintaining an MRUL that better discriminates amongst historical network attachment information of a wireless communication device. It would be advantageous if a wireless communication device could utilize its MRUL to readily identify available wireless networks associated with its carrier during network reselection events to avoid wasting valuable device resources, i.e., by performing redundant and/or unnecessary frequency scans outside of its carrier's allocated frequency spectra.

SUMMARY OF DESCRIBED EMBODIMENTS

Some embodiments disclosed herein provide for rapid network reselection at a wireless communication device following a network detachment event that may be associated with a sleep event, a power savings mode event, or some other common network disassociation event. In this regard, a wireless communication device in accordance with some implementations can generate and maintain a most recently used list (MRUL) that selectively includes carrier frequency resource information that can be utilized by the wireless communication device to effectuate various network reselections. Notably, the timing requirements for these MRUL based network reselections, which may occur following various types of network detachment events, can be minimized by discriminatively searching only for recently available network resources that are associated with the wireless communication device's carrier. This limited, proprietary frequency spectra scan may be alternatively referred to herein as a "quick scan" or a "rapid scan."

In accordance with one aspect of the disclosure, a wireless communication device can perform network reselection by attempting to reacquire a first network (e.g., a wireless network to which the wireless communication device was most recently attached, immediately preceding a network detachment event) after a network detachment event associated with a sleep event or device power savings event. When the reacquisition of the first network is determined to be unsuccessful, the device may attempt an alternate network acquisition using a MRUL. The MRUL can be stored in a memory of the wireless communication device at a designated location. The wireless communication device can also determine whether the alternate network acquisition attempt was successful, and based on this determination, the wireless communication device can attach to a second network and then store information associated with the second network within a portion of its memory (e.g., within its MRUL).

In accordance with another aspect of the disclosure, the MRUL may include information about various frequency bands allocated to a primary service provider with which the wireless communication device is affiliated (e.g., the wireless communication device's carrier). The MRUL may also include information about various radio access technologies (RATs) of the primary service provider that indicates whether the first network is associated with a 4G long term evolution (LTE) network, a 3G legacy network, or a 2G legacy network, as well as whether the second network is associated with a 4G LTE network, a 3G legacy network, or a 2G legacy network.

In accordance with an embodiment, the alternate network acquisition using the MRUL may involve the wireless communication device determining to scan only frequency bands allocated to the primary service provider (as opposed to scanning frequency bands allocated to roaming service providers with which the wireless communication device is not affiliated), before attaching to the second network, which can be a wireless communication network of the primary service provider.

In accordance with another embodiment, when the wireless communication device determines that the alternate network acquisition attempt was not successful, the wireless communication device may attempt a roaming network acquisition using an Equivalent Preferred Roaming List (EQPRL) list that can include information about frequency bands allocated to each of multiple roaming service providers. The frequency bands allocated to each of the roaming service providers may be different from the frequency bands allocated to the primary service provider.

In another aspect of the disclosure, during the roaming network acquisition, the wireless communication device may scan the frequency bands allocated to the roaming service providers before attaching to the second network. In this scenario, the second network may be a wireless communication network of one of the roaming service providers.

In an embodiment, a wireless communication device may include one or multiple transceivers that can communicate data via a first network and via a second network, processing circuitry that is coupled to the transceiver(s), and a memory that is coupled to the processing circuitry. The processing circuitry may be capable of executing computer program instructions that cause the wireless communication device to attempt an alternate network acquisition by scanning only frequency bands allocated to a service provider of the wireless communication device in response to determining an attempted acquisition of the first network to be unsuccessful, and then acquire the second network after detecting one or multiple communication channels associated with the service provider's allocated frequency bands.

In accordance with one aspect of the disclosure, the one or more frequency bands allocated to the service provider of the wireless communication device can be stored within a MRUL in the memory of the wireless communication device. The MRUL may also include information about one or more RATs of the service provider that indicates whether the first or second network is associated with a 4G LTE network, a 3G legacy network, or a 2G legacy network.

In another embodiment, a non-transitory computer-readable storage medium can store a set of computer program instructions, which when executed by one or more processors of a wireless communication device, cause the wireless communication device to attempt an acquisition of a first network after a network detachment event that may be associated with a sleep event of the wireless communication device or a power savings mode event of the wireless communication device. When an attempted acquisition of the first network is determined to be unsuccessful, the execution of the computer program instructions may further cause the wireless communication device to attempt an alternate network acquisition using a MRUL of the wireless communication device. Then, the execution of the computer program instructions may cause the wireless communication device to attach to a second network based on a determination of whether the alternate network acquisition attempt was successful.

In accordance with another aspect of the disclosure, the MRUL can comprise information about one or multiple frequency bands allocated to a primary service provider with which the wireless communication device is affiliated. Further, the alternate network acquisition using the MRUL may include scanning only frequency bands allocated to the primary service provider.

In an embodiment, the execution of the computer program instructions may further cause the wireless communication device to determine an alternate network acquisition attempt to not be successful, and to attempt a roaming network acquisition using an EQPRL that includes information about one or more frequency bands allocated to various roaming service providers.

The above summary is provided merely for purposes of summarizing some example embodiments that aid in describing certain aspects of the disclosure. Accordingly, it should be understood that the above summary should not be construed as narrowing the scope of the ensuing claims in any way. Other aspects, and advantages of the embodiments of the disclosure will become apparent from the following description taken in conjunction with the accompanying drawings, which help to illustrate fundamental principles that are described in further detail herein.

BRIEF DESCRIPTION OF THE DRAWINGS

The described embodiments and the advantages thereof may best be understood with reference to the following description taken in conjunction with the accompanying drawings. These drawings are not necessarily drawn to scale, and they are in no way intended to limit or exclude foreseeable modifications thereto in form and detail that may be made by one having ordinary skill in the art.

DETAILED DESCRIPTION

Figure 1:
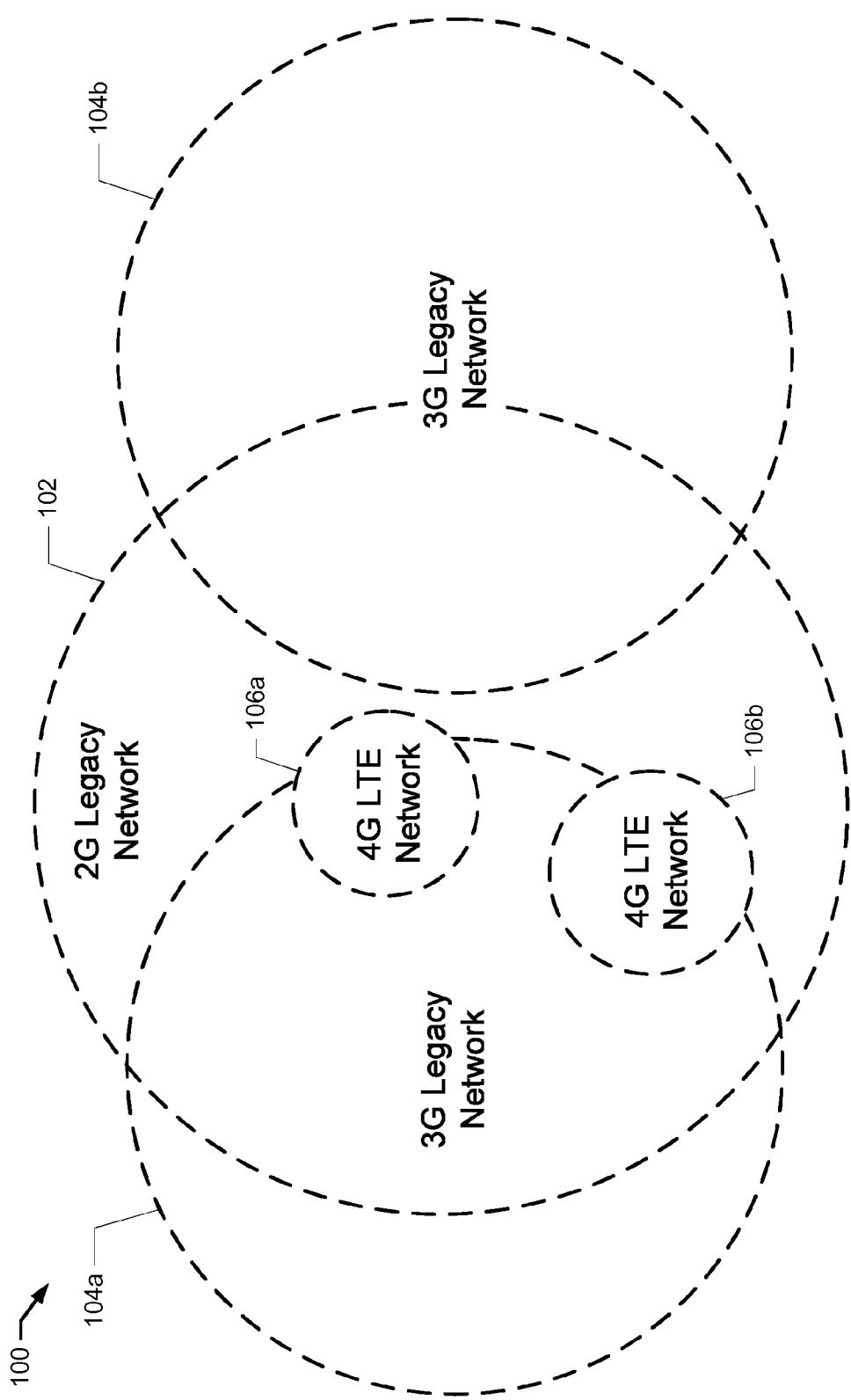
FIG. 1 illustrates a heterogeneous network topology of overlapping wireless network coverage areas including fourth generation (4G) LTE networks, third generation (3G) legacy networks, and second generation (2G) legacy networks in accordance with some embodiments.

Representative examples and applications of various network selection and reselection procedures, as well as corresponding apparatuses, are described within this section. These examples are provided to add context to, and aid in the understanding of, the subject matter of this disclosure. It should be apparent to one having ordinary skill in the art that the present disclosure may be practiced with or without some of the specific details described herein. Further, various modifications and/or alterations can be made to the subject matter described herein and illustrated in the corresponding figures to achieve similar advantages and results, without departing from the spirit and scope of the disclosure.

References are made in this section to the accompanying figures, which form a part of the description and in which are shown, by way of illustration, specific implementations in accordance with the described embodiments. Although these embodiments are described in sufficient detail to enable one skilled in the art to practice the described embodiments, it should be understood that these examples are not to be construed as being overly-limiting.

Several of the disclosed embodiments relate to rapid network reselection procedures over carrier-specific networks that can be employed at a wireless communication device, either autonomously at the device, or in conjunction with instruction from a network service provider control entity. These network reselections can result from one or more carrier scans or searches, which may occur subsequent to and/or in response to various network detachment events, including, but not limited to: device sleep events and power savings mode events (including device Idle mode transitions), network failure events (including dropped calls and/or failed IP data transfers), inter radio access technology (inter-RAT) network transitions and other handover events, as well as any number of other common cellular communication events that may lead to a network state transition for a wireless communication device.

It should be understood that the term "wireless communication device" can be used herein to describe any number of common consumer electronic communication devices, including, but not limited to: cellular phones or smart phones, tablet computers, laptop computers or netbook computers, media player devices, electronic book devices, MiFi® devices, as well as any other type of electronic computing device having wireless communications capability that can allow the device to attach to, and communicate over, a cellular communication network.

Additionally, some embodiments may employ multi-mode wireless communication devices that are capable of communicating via multiple, different fourth generation (4G), third generation (3G), and/or second generation (2G) RATs. These devices are typically configured to prefer attachment to more robust networks offering faster data rates (i.e., higher throughput) as compared to lower throughput legacy networks that may be outmoded in certain geographic areas, such as within various metropolitan regions.

Accordingly, network reselections to 4G RATs associated with high-throughput Long Term Evolution (LTE) networks can be prioritized for a capable wireless communication device whenever a proprietary LTE network of the device's carrier is available for attachment. Further, the multi-mode wireless communication device may attach to a proprietary LTE network by default, while only giving secondary consideration to various Channel Quality Indicator (CQI) metrics, such as Reference Signal Strength Indication (RSSI), Reference Signal Receive Power (RSRP), Reference Signal Receive Quality (RSRQ), etc., which are measurable quality metric that may otherwise force a transition to a less robust RAT.

FIG. 1 illustrates various overlapping multi-RAT coverage areas within a heterogeneous network topology 100, which can enable network resections for a wireless communication device 208 that is travelling between and amongst different geographic regions within the heterogeneous network topology 100. In accordance with some embodiments, which are described in further detail below, these multi-RAT coverage areas may be associated with one or more 4G cellular networks 106a-b employing LTE and/or LTE Advanced networks, one or more 3G legacy networks 104a-b employing Universal Mobile Telecommunications System (UMTS)/ High Speed Packet Access (HSPA) networks or one or more Code Division Multiple Access (CDMA) 2000/1× Evolution-Data Only (1× or EV-DO) networks, as well as, one or more 2G legacy networks 102 employing Global System for Mobile Communications (GSM)/Enhanced Data Rate for GSM Evolution (EDGE) networks, etc.

The 4G LTE networks 106a-b, the 3G legacy networks 104a-b, and the 2G legacy networks 102 can each have corresponding regions of wireless coverage that are represented by the respective dashed circles depicted in FIG. 1. The multi-RAT coverage areas 106a-b, 104a-b, and 102, can overlap with one another, in such a manner that that coverage areas 106a-b associated with various LTE femtocells may be encompassed by one or more overarching 3G and 2G legacy network coverage areas 104a-b and 102 that may be associated with either legacy microcells and/or legacy macrocells.

In various implementations, a wireless communication device 208 may be configured to communicate via the 4G LTE networks 106a-b in conjunction with or in isolation from the 3G and 2G legacy networks 104a-b and 102. By way of example, when the wireless communication device 208 is located in a particular geographic region having overlapping wireless coverage, the device 208 can be configured to readily scan for and attach to, any of the different available RATs of the heterogeneous network topology 100. In various embodiments, rapid network scans can occur in response to and/or subsequent to a particular network detachment or disassociation event. In some implementations, a wireless communication device 208 may perform one or more network scans to selectively search a subset of frequency bands associated with a group of available networks, in order to initially attempt to establish communications using the network resources of a specific carrier.

Figure 2:
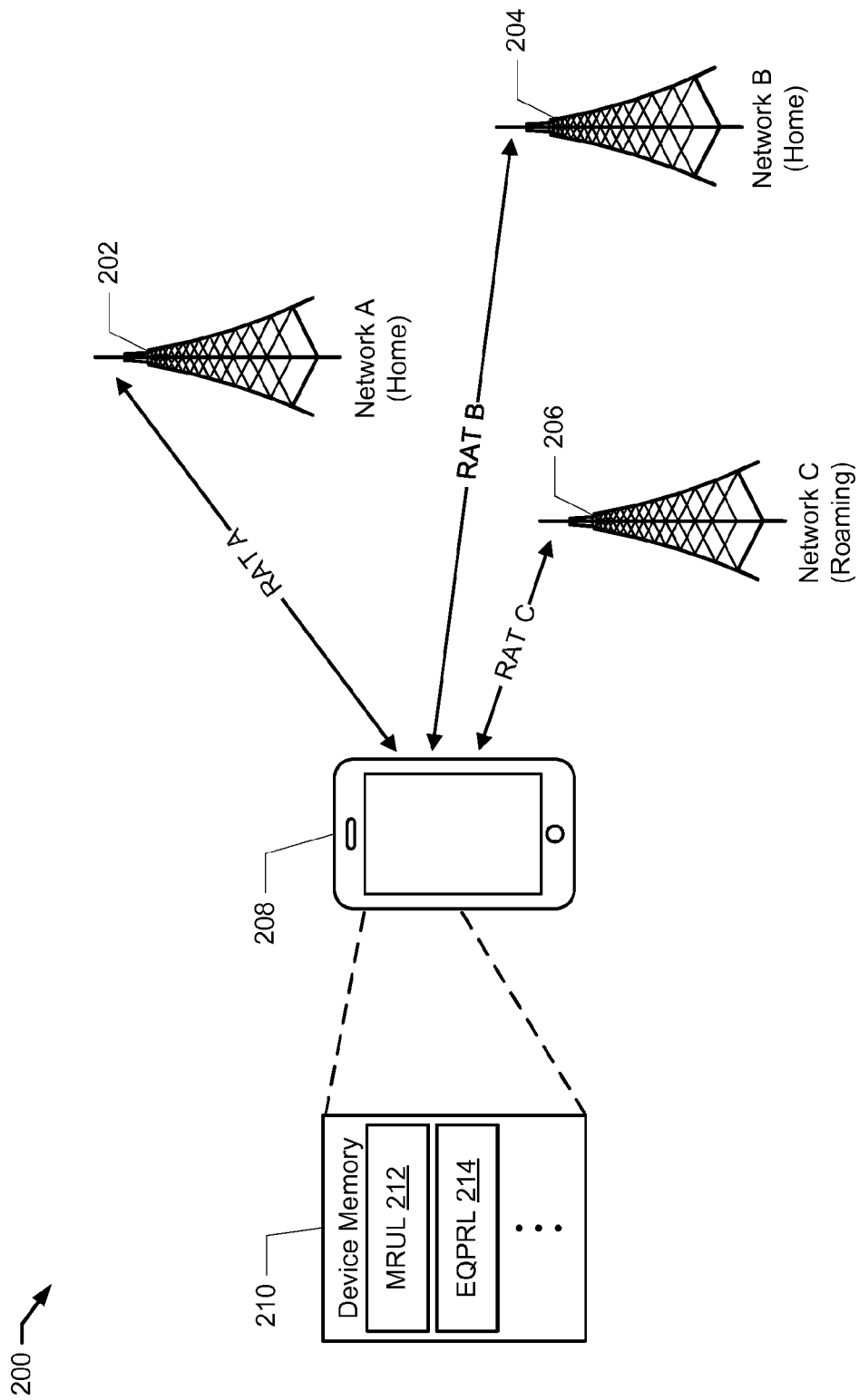
FIG. 2 illustrates a wireless communication system including a wireless communication device having a Most Recently Used List (MRUL) and an Equivalent Preferred Roaming List (EQPRL) stored in a device memory, in accordance with some implementations.

FIG. 2 depicts a wireless communication system 200 including a wireless communication device 208 having a Most Recently Used List (MRUL) 212 and an Equivalent Preferred Roaming List (EQPRL) 214 stored in a portion of the device's 208 memory 210. The wireless communication system 200 also includes multiple network base stations that may correspond to: a first base station 202 providing wireless communications services associated with the device's 208 home network, a second base station 204 also providing wireless communications services associated with the device's 208 home network, and a third wireless base station 208 providing wireless communications services associated with a roaming network, which may or may not be a preferred roaming partner of the device's 208 carrier. Each of the first, second, and third base stations, 202, 204, and 206, may employ similar or different RATs, RATs A, B, and C, that can correspond to any common RAT that may be associated with the 4G LTE networks 106a-b, the 3G legacy networks 104a-b, and/or the 2G legacy networks 102 described above with respect to FIG. 1.

As illustrated in FIG. 2, the wireless communication device 208 can be positioned within a defined signaling range of each of the three base stations 202, 204, and 206. In this regard, the wireless communication device 208 may be located in a region of overlapping coverage that is respectively associated with RAT A and RAT B of its home network (e.g., its carrier network), and with RAT C of a roaming network. During an initial network search procedure, the wireless communication device 208 may detect each of the three base stations 202, 204, and 206, located within, and providing coverage to, a geographic region that is associated with the device's 208 current location. This search procedure may scan multiple, different frequency bands associated with its carrier's LTE network (e.g., Network A), its carrier's 3G legacy network (e.g., Network B), and a roaming carrier's LTE network (e.g., Network C). As would be understood by those skilled in the art, different carriers operate on different licensed frequency spectra. Accordingly, the wireless communication device 208 may need to scan several carrier-specific frequency bands in order to adequately search for all available networks. This multi-carrier scan procedure can be significantly more time consuming than scanning a single carrier's allocated frequency resources.

In various embodiments, it may be preferred for the wireless communication device 208 to attach to one of its carrier's networks, Networks A or Network B, such as in a scenario where the roaming network, Network C, is not a roaming partner of the device's 208 carrier. However, in other scenarios, if roaming Network C is determined to be a roaming partner of the carrier, then the device 208 may wish to attach to roaming Network C, a robust 4G LTE network, before attaching to home Network B, a slower 3G legacy network. However, it may still be preferred for the device 208 to attach to Network A (a home 4G LTE network) before selecting to attach to roaming Network C. Network attachment prioritization rules may vary based on carrier's preferences, available RATs, requisite frequency band scans, various network quality of service (QoS) metrics, etc.

As will be described further herein with respect to the network selection and reselection procedures 400, 500, and 700 respectively depicted in FIGS. 4, 5, and 7, and described further herein, the wireless communication device 208 may be configured to perform an initial quick scan or rapid scan of proprietary frequency bands associated with its carrier in response to a network detachment event, after a reacquisition attempt of a last used communication channel fails. This simple reacquisition process can attempt to reattach to the same communication channel that a wireless communication device 208 was utilizing prior to a network detachment event, e.g., a device Idle mode event, without performing a network scan before attempting to reattach to the communication channel.

In various implementations, the wireless communication device 208 may acquire prioritized information within its MRUL 212 that has been discriminated from roaming carrier information, to effectuate a rapid network scan of only proprietary frequency bands associated with the device's carrier. Accordingly, MRUL 212 information may be filtered by frequency resource preferences of a carrier, without regard for the actual attachment ordering of the most recently used networks of the wireless communication device 208. In this manner, the MRUL 212 may be adaptively filtered to limit a number of frequency bands to scan during quick scans, in such a manner that only a few identified carrier frequency bands of interest are scanned at a specific geographic location by the wireless communication device 208.

Figure 3:
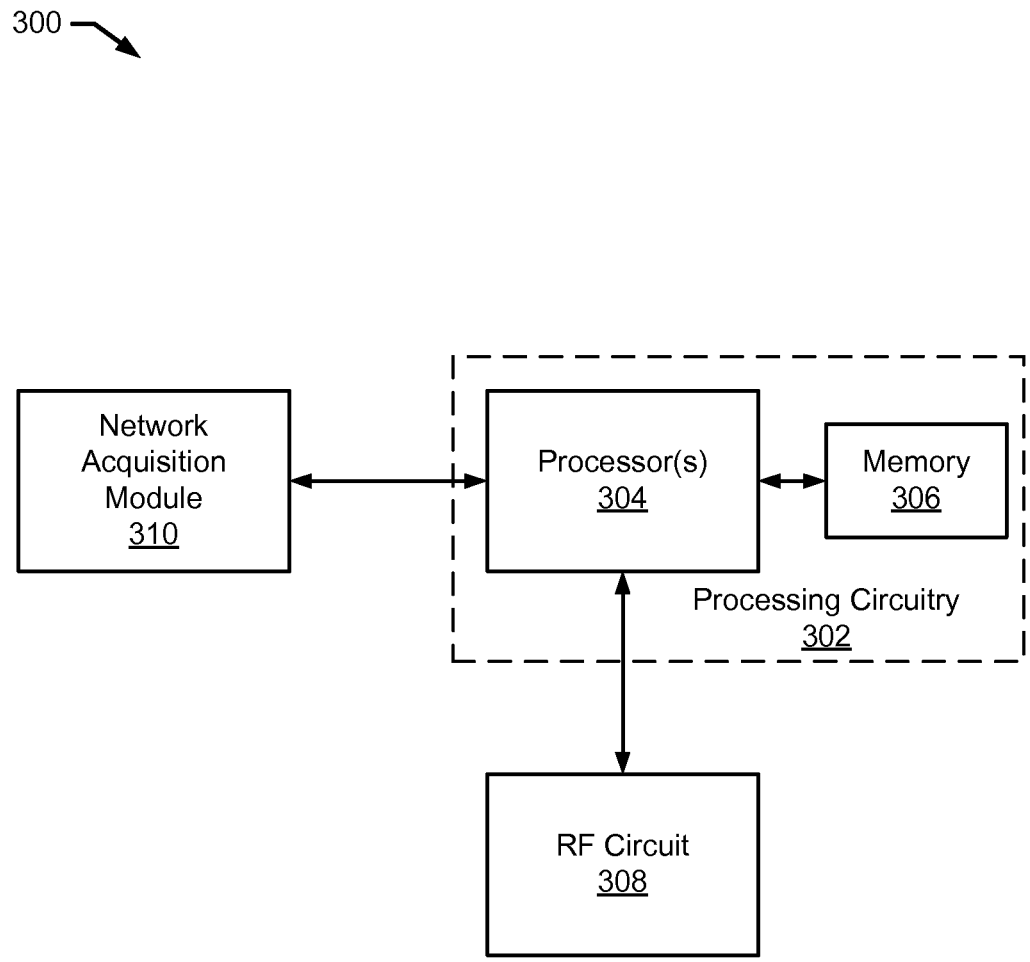
FIG. 3 illustrates a block diagram of an apparatus including a network acquisition module that can perform network reselection procedures in accordance with various embodiments of the disclosure.
Figure 4:
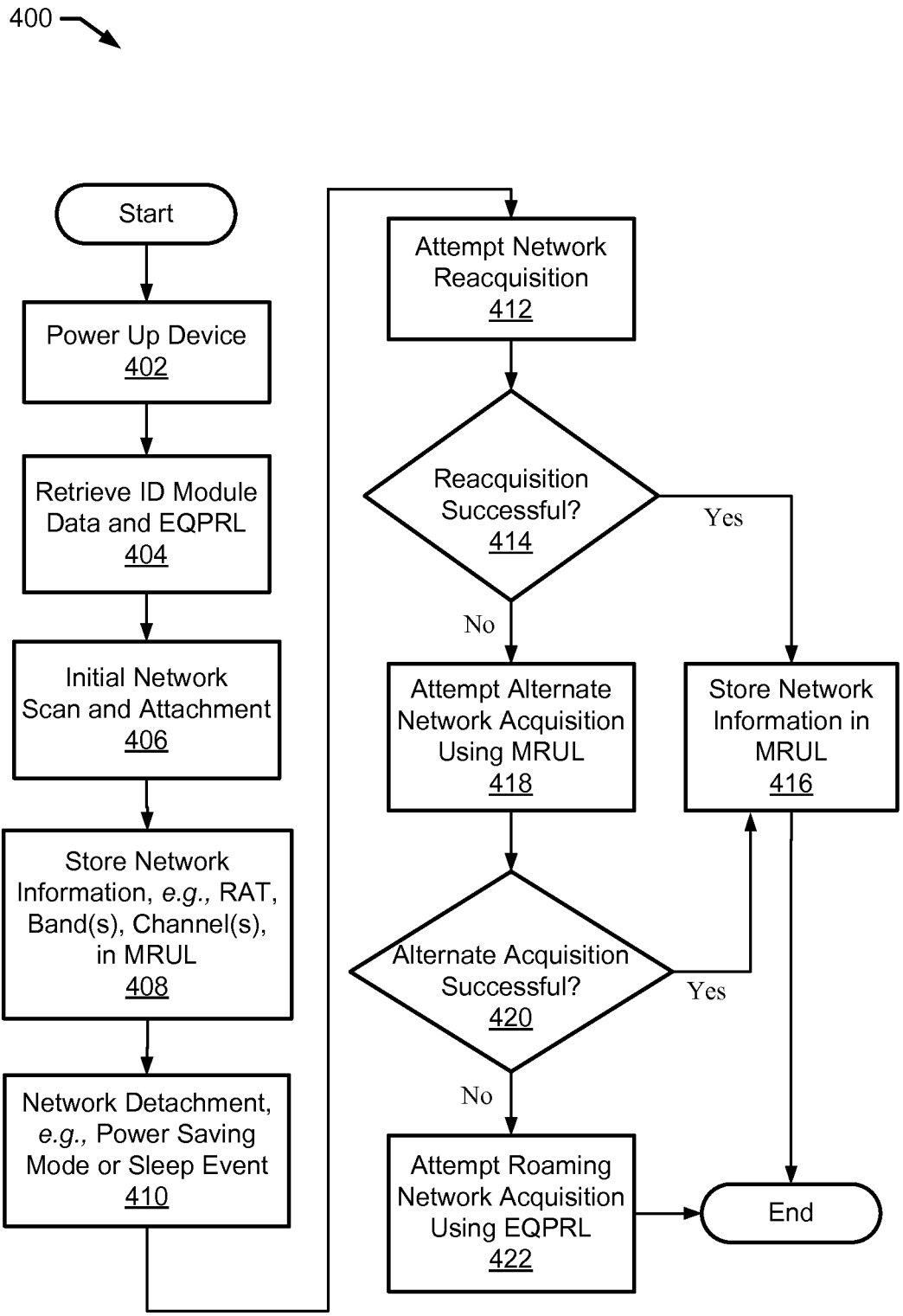
FIG. 4 illustrates a flowchart associated with example methods of network selection and network reselection following a network detachment event in accordance with some embodiments.
Figure 5:
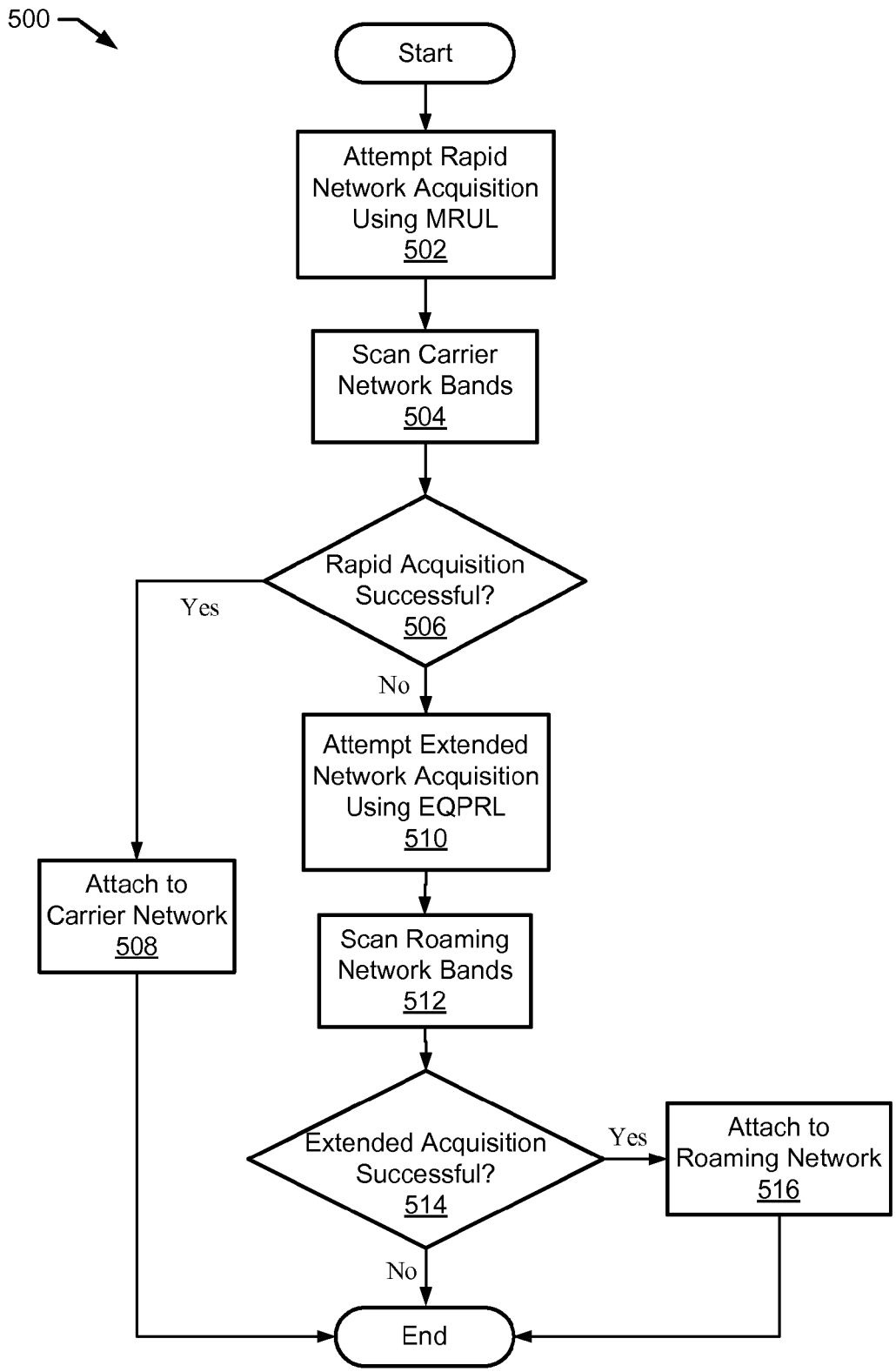
FIG. 5 illustrates a flowchart depicting an example method of rapid network reselection following a network detachment event according to certain embodiments described herein.
Figure 7:
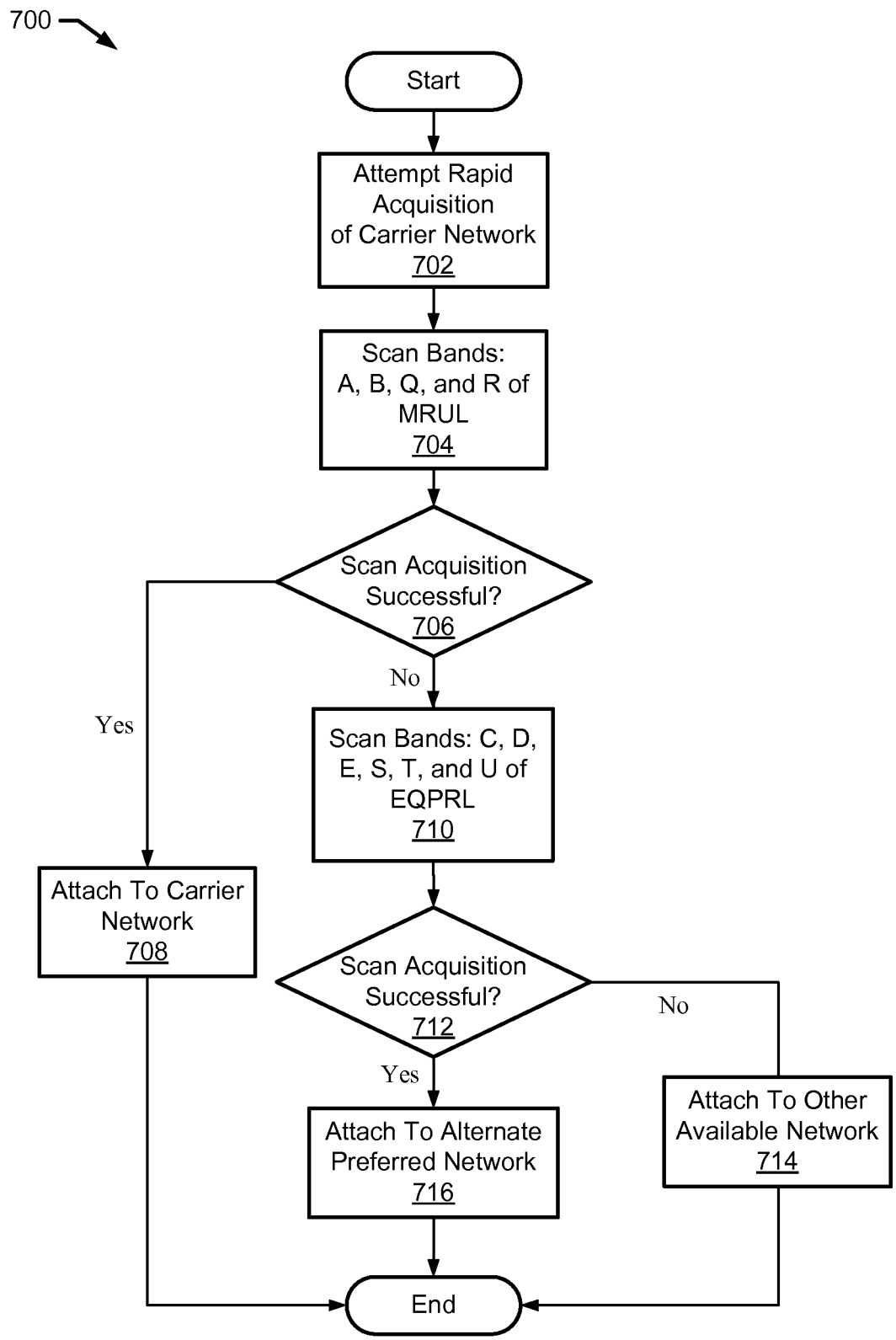
FIG. 7 illustrates a flowchart according to an example method of a selective network reselection following a network detachment event according to some embodiments described herein.

FIG. 3 illustrates a block diagram of an apparatus 300 including a network acquisition module 310 that can be configured to perform various network selection and reselection procedures in accordance with various embodiments of the disclosure, such as any of the network selection and reselection procedures 400, 500, and 700 respectively depicted in FIGS. 4, 5, and 7, which are described in further detail herein. It should be understood that the apparatus 300 depicted in FIG. 3 can be implemented at a wireless communication device 208 in accordance with some example embodiments. In this regard, when implemented at a computing device, such as wireless communication device 208, apparatus 300 can enable the device 208 to operate within the wireless communication system 200 in accordance with one or more embodiments. It should also be appreciated that not all of the components, device elements, and hardware illustrated in and described with respect to FIG. 3 below may be essential to the disclosure, and thus, some may be omitted, modified, or consolidated in certain embodiments. Additionally, in some implementations, this subject matter can include additional or different components, device elements, or hardware beyond those illustrated in, and described with respect to FIG. 3.

In some configurations, the apparatus 300 can include processing circuitry 302 that is configurable to perform actions in accordance with one or more example embodiments disclosed herein. In this regard, the processing circuitry 302 can be configured to perform and/or control performance of one or more functionalities of the apparatus 300 in accordance with various example embodiments, and thus can provide various instrumentalities for performing communication procedures of the apparatus 300 in accordance with various embodiments. The processing circuitry 302 may be configured to perform data processing, application execution and/or other control and management functions according to one or more example embodiments.

In some implementations, the apparatus 300 or portions or components thereof, such as the processing circuitry 302, can include one or more chipsets, which can respectively include one or more coupled microchips thereon. The processing circuitry 302 and/or one or more other components of the apparatus 300 can therefore, in some instances, be configured to implement functions associated with various procedures of the disclosure using one or multiple chips or chipsets. In some example embodiments in which one or more components of the apparatus 300 are embodied as or within a chipset, the chipset may be capable of enabling a wireless communication device 208 to operate within the wireless communication system 200 when implemented, or otherwise operably coupled to, the wireless communication device 208. Thus, for example, one or more components of the apparatus 300 may provide a chipset configured to enable the wireless communication device 208 to operate over one or more 4G LTE networks 106a-b, 3G legacy networks 104a-b, and/or 2G legacy networks 102, as depicted in FIG. 1.

In some example scenarios, the processing circuitry 302 can include one or more processors 304 and, in some embodiments, such as that illustrated in FIG. 3, can further include a memory or memories 306. In various embodiments, the processing circuitry 302 may be in communication with, or otherwise coupled to, an RF circuit 308 and a network acquisition module 310. In some implementations, the processor(s) 304 may be embodied in a variety of forms. For example, the processor(s) 304 can be embodied as a microprocessor, a coprocessor, a controller, or various other computing or processing implements, including integrated circuits such as, for example, an ASIC (application specific integrated circuit), an FPGA (field programmable gate array), or some combination thereof.

In various embodiments, multiple processors 304 can be coupled to and/or in operative communication with each other and these components may be collectively configured to perform one or more procedures of the apparatus 300 as described herein in the form of a wireless communication device 206. In some implementations, the processors 304 can be configured to execute instructions that may be stored in the memory 306 or that can be otherwise accessible to the processors 304 in some other device memory. As such, whether configured by, or in conjunction with, hardware or by a combination of hardware and software, the processors 304 may be capable of performing operations according to various embodiments described herein when configured accordingly.

In various embodiments, the memory 306 may include multiple memory devices that may be of a common volatile or a non-volatile memory type. Memory 306 can include fixed and/or removable memory type devices. In some scenarios, the memory 306 can be associated with a non-transitory computer-readable storage medium that can store various computer program instructions that may be executed by the processor(s) 304 of the processing circuitry 302 during normal program executions. In this regard, the memory 306 can be configured to store information (e.g., information of the MRUL 604a-b and the EQPRL 606a-b of FIG. 6), data, applications, instructions, or the like, for enabling the apparatus 300 to carry out various functions in accordance with one or more embodiments of the disclosure. In some implementations, the memory 306 may be in communication with, and coupled to, the processor(s) 304 of the processing circuitry 302 and one or more system buses for passing information between and amongst the different device components of the apparatus 300.

The apparatus 300 can further include an RF circuit 308 including one or more transceivers. The transceivers of the RF circuit 308 can enable the apparatus 300 to send wireless signals to, and receive wireless signals from, one or more wireless networks, such as one or more 4G LTE networks 106a-b, 3G legacy networks 104a-b, and/or 2G legacy networks 102, as depicted in FIG. 1. In some example embodiments, the RF circuit 308 may include a single transceiver configured to enable the wireless communication device 208 to connect to 4G LTE networks 106a-b, as well as a second and/or a third transceiver configured to enable the wireless communication device 208 to connect to 3G legacy networks 104a-b and/or 2G legacy networks 102.

The apparatus 300 can further include a network acquisition module 310. The network acquisition module 310 can be embodied as circuitry, hardware, a computer program product comprising computer-readable program instructions stored on a computer-readable medium (e.g., on the memory 306) and executable by the processors 304, or some combination thereof. In some embodiments, the processors 304 or the processing circuitry 302 can include, or otherwise control, operations of the network acquisition module 310.

In various embodiments, the network acquisition module 310 can be configured to make network provisioning determinations, such as those associated with the network selection and reselection procedures 400, 500, and 700 respectively depicted in the flow diagrams of FIGS. 4, 5, and 7, which are described in further detail herein. In some scenarios, the network acquisition module 310 can enable the wireless communication device 208 to perform various selective network searching or scanning procedures that may be limited to a designated subset of frequency bands associated with a preferred service provider, or carrier, of the wireless communication device 208 (e.g., during an MRUL scan for select carrier frequencies).

In other scenarios, the network acquisition module 310 can enable the wireless communication device 208 to perform various network searching or scanning procedures that may include a subset of frequency bands associated with a preferred service provider of the wireless communication device 208, as well as a subset of frequency bands associated with any number of preferred roaming partners of the wireless communication device 208 (e.g., during and EQPRL scan), or any number of non-affiliated roaming networks that are unfamiliar to the wireless communication device 208, or both.

Additionally the network acquisition module 310 may be configured to make various network attachment determinations, based in part on the network detection results of the frequency band scanning procedures. For instance, when multiple carrier networks or roaming networks are detected as being available to a wireless communication device 208, the network acquisition module 310 may be configured to make a determination as to which one of the multiple network the wireless communication device 208 should attach to at a given time. Moreover, in some embodiments, the network acquisition module 310 can facilitate the wireless communication device 208 connecting to a preferred network based on various prioritization rules that may be associated with a carrier's preferences, available RATs, frequency bands, channels, as well as based on various network quality of service (QoS) metrics.

FIG. 4 illustrates a flowchart depicting various network selection and reselection procedures 400 that can occur in accordance with various embodiments. It should be understood that any, or all of, the network provisioning procedures 400 depicted in FIG. 4 may be associated with a method, or methods, that can be implemented by the execution of computer program instructions stored on a non-transitory computer-readable memory 210 of a wireless communication device 208, and optionally, in conjunction with the execution of computer program instructions stored on a non-transitory computer-readable memory of a network service provider controlling entity. Initially, at operation block 402 a wireless communication device 208 may be powered-up, such as when a user turns on his or her computing device. At this time, it is assumed that the wireless communication device 208 is not presently associated with, or otherwise attached to, a particular wireless communication network at the device's 208 current geographic location.

After the wireless communication device 208 is powered on, at operation block 404, the wireless communication device 208 may retrieve basic network identifying information stored in its network identification module (e.g., information resident within its carrier-provided SIM card), such as its international mobile subscriber identity (IMSI) information, which can include the device's 208 mobile country code (MCC), mobile network code (MNC), and mobile subscriber identification number (MSIN). Additionally, the device 208 may retrieve and load its equivalent preferred roaming list 214 (EQPRL) from memory 210, based on its corresponding IMSI data.

In some embodiments the EQPRL may pertain to a public land mobile network (PLMN) list for 3GPP network access technologies; whereas in other embodiments, the EQPRL may pertain to a preferred roaming list (PRL) for 3GPP2 network access technologies. Accordingly, the EQPRL should not be construed to be a different entity from either a PLMN or a PRL. The EQPRL may be associated either a PLMN a PRL, or both. In some implementations, the EQPRL may include information relating to a multiple preferred roaming partner networks, and for each of those networks, the EQPRL can include information associated with the network's system ID, network ID, frequency band information, channel information, geographic information, etc.

At operation block 406, the wireless communication device 208 may employ its network acquisition module 310 to attempt to complete a full or a partial network scan of frequency bands associated with its carrier network, as well as, of frequency bands associated with other identified local roaming networks. This scan can be facilitated when the mobile communication device utilizes the corresponding network information stored in its EQPRL. After this initial full network scan, it is assumed that one or more available carrier(s) and/or roaming networks may be identified as being available to the wireless communication device 208 at its present location. Based on the network search results, the wireless communication device 208 may employ the network acquisition module 310 to attach to a preferred network.

By way of example, the wireless communication device 206 may elect to attach to an available LTE network of its carrier network, which it detected in a scan of proprietary frequency bands within the 700 MHz, 1700 MHz, or 2100 MHz mobile spectra. Alternatively, the wireless communication device may elect to attach to an available 3G legacy UMTS or 1× networks, which it detected in a scan of proprietary frequency bands within the 850 MHz or 1900 MHz mobile spectra.

Following a network acquisition, at operation block 408, the mobile communication device 208 may store various network information associated with its attached carrier network (i.e., RAT type, frequency band information, channel information, etc.) within its MRUL 212, which may be stored within a portion of its device memory 210.

Then at operation block 410, the wireless communication device 208 may experience a network detachment event associated with a device sleep event, a device power savings mode event, etc. In some embodiments the network detachment event may correspond to the wireless communication device 208 entering into a radio resource control (RRC) Idle mode or the wireless communication device 208 entering into a discontinuous reception (DRX) Idle mode portion of an RRC Idle mode. In these scenarios, after the wireless communication device 208 exits the DRX Idle mode may attempt to reattach, at operation block 412, to the same network channel it was attached to, immediately preceding the Idle mode. In this regard, the wireless communication device 208 may not perform a network scan to determine if the communication channel is available. Instead, the wireless communication device 208 can employ its network acquisition module 310 to resume communications using this familiar communication channel.

At decision block 414, a determination is made as to whether the network reacquisition was successful. In a scenario where the wireless communication device 208 was able to reacquire the same communication channel it had been using to communicate with prior to the network detachment event, at operation block 416, the wireless communication device 208 may store updated network channel information associated with the communication channel in the MRUL 212 to effectuate future network selection or reselection procedures.

However, in a scenario where the wireless communication device 208 was not able to reacquire the same communication channel it had been using to communicate with prior to the network detachment event, the process will proceed to operation block 418, where the wireless communication device 208 may attempt an alternate network acquisition using network information stored in the MRUL 212. The wireless communication device's MRUL 212 may include an abbreviated listing of one or more network systems to which the wireless communication device was most recently attached. These most recently used networks stored in the MRUL 212 may be discriminated by carrier, carrier frequency resource, channel, etc. In various implementations, the MRUL 212 can allow the network acquisition module 310 of the wireless communication device 208 to readily identify familiar carrier networks during a short-listed frequency scan procedure.

By way of example, the wireless communication device 208 may utilize its network acquisition module 310 to identify one or more carrier network frequency bands to scan for during the alternate network acquisition attempt using the MRUL 212. In some embodiments, frequency bands associated with roaming network carriers may be discriminated against by the network acquisition module 310, such that only a small number of proprietary frequency bands would be searched after the network detachment event. This would lead to a rapid scan of a selection of frequency bands that could enable the wireless communication device 208 to readily attach to a preferred carrier network without wasting time by searching for unnecessary auxiliary frequency bands of other non-affiliated carriers during its quick scan. In this manner the requisite timing requirements for a MRUL 212 search could be reduced, as the attachment contents of the MRUL could be discriminated accordingly the preferences and network resources of a particular carrier.

At decision block 420, a determination is made as to whether the alternate network acquisition using the MRUL 212 was successful. In a scenario where the wireless communication device 208 was able to detect and attach to a proprietary carrier network during the alternate network acquisition, the wireless communication device 208 can store the updated network attachment information in the MRUL 212 to effectuate future network selection or reselection procedures. However, in a scenario where the wireless communication device 208 was not able to detect and attach to a proprietary carrier network during the alternate network acquisition, the wireless communication device 208 may attempt a roaming network acquisition using its EQPRL 214 at operation block 422.

In various embodiments, a roaming network acquisition procedure may entail the wireless communication device 208 employing its network acquisition module 310 to identify one or more roaming carrier network frequency bands to scan for during the roaming network acquisition attempt using the EQPRL 214. The roaming network acquisition allows the wireless communication device 208 to connect to a backup network that may be associated with a preferred roaming partner of the carrier of the wireless communication device.

FIG. 5 illustrates a flowchart depicting an example rapid network reselection procedure 500 following a network detachment event according to some embodiments. It should be understood that any, or all of, the network reselection procedures 500 depicted in FIG. 5 may be associated with a method, or methods, that can be implemented by the execution of computer program instructions stored on a non-transitory computer-readable memory 210 of a wireless communication device 208, and optionally, in conjunction with the execution of computer program instructions stored on a non-transitory computer-readable memory of a network service provider controlling entity. Initially, at operation block 502 a wireless communication device 208 may attempt a rapid network acquisition using its MRUL 212 which may be stored at a location within its device memory 210.

In some implementations, the rapid network acquisition at block 502 may occur in response a network detachment event at the wireless communication device 208 that can be associated with a device sleep event, a device power savings mode event, etc. In some embodiments the network detachment event may correspond to the wireless communication device 208 entering into a radio resource control (RRC) Idle mode or the wireless communication device 208 entering into a discontinuous reception (DRX) Idle mode portion of an RRC Idle mode. In these scenarios, after the wireless communication device 208 exits the DRX Idle mode may initially attempt to reattach to the same network channel it was attached to, immediately preceding the Idle mode. In this regard, the wireless communication device 208 may not perform a network scan to determine if the communication channel is available. Instead, the wireless communication device 208 can employ its network acquisition module 310 to resume communications using this familiar communication channel.

When the wireless communication device 208 is not able to reacquire the same communication channel it had been using to communicate with prior to the network detachment event, the wireless communication device 208 will attempt the rapid network acquisition in part by performing a network scan of a carrier network bands at operation block 504, using network information stored in the MRUL 212. The wireless communication device's MRUL 212 may include an abbreviated listing of one or more network systems to which the wireless communication device was most recently attached. These most recently used networks stored in the MRUL 212 may be discriminated by carrier, carrier frequency resource, channel, etc. In various implementations, the MRUL 212 can allow the network acquisition module 310 of the wireless communication device 208 to readily identify familiar carrier networks during a rapid frequency scan procedure.

By way of example, the wireless communication device 208 may utilize its network acquisition module 310 to identify one or more carrier network frequency bands to scan for during the rapid network acquisition attempt 502. This limited frequency band could enable the wireless communication device 208 to readily attach to a preferred carrier network without wasting time by searching for unnecessary auxiliary frequency bands of non-affiliated carriers during the rapid scan. In this manner, the requisite timing requirements for an associated MRUL 212 search could be significantly reduced.

At decision block 506, a determination is made as to whether the rapid network acquisition using the MRUL 212 was successful. In a scenario where the wireless communication device 208 was able to detect a preferred carrier network during the rapid network acquisition, the wireless communication device 208 can attach to the preferred carrier network at operation block 508. However, in a scenario where the wireless communication device 208 was not able to detect a preferred carrier network during the rapid network acquisition, the wireless communication device 208 may attempt an extended network acquisition using its EQPRL 214 at operation block 510.

In various embodiments, extended network acquisition may entail the wireless communication device 208 employing its network acquisition module 310 to scan for one or more roaming carrier network frequency bands at operation block 512 using the EQPRL 214. The extended network acquisition allows the wireless communication device 208 to connect to a backup network that may be associated with a preferred roaming partner of the carrier of the wireless communication device. At decision block 514 a determination is made as to whether the extended network acquisition is successful. When the extended network acquisition is determined to be successful, then the wireless communication device 208 can attach to a preferred roaming network at operation block 516. However, if the extended network acquisition is determined not to be successful then extended acquisition process ends and the wireless communication device 208 may attempt to acquire other non-roaming partner networks in subsequent network acquisition attempt procedures.

Figure 6:
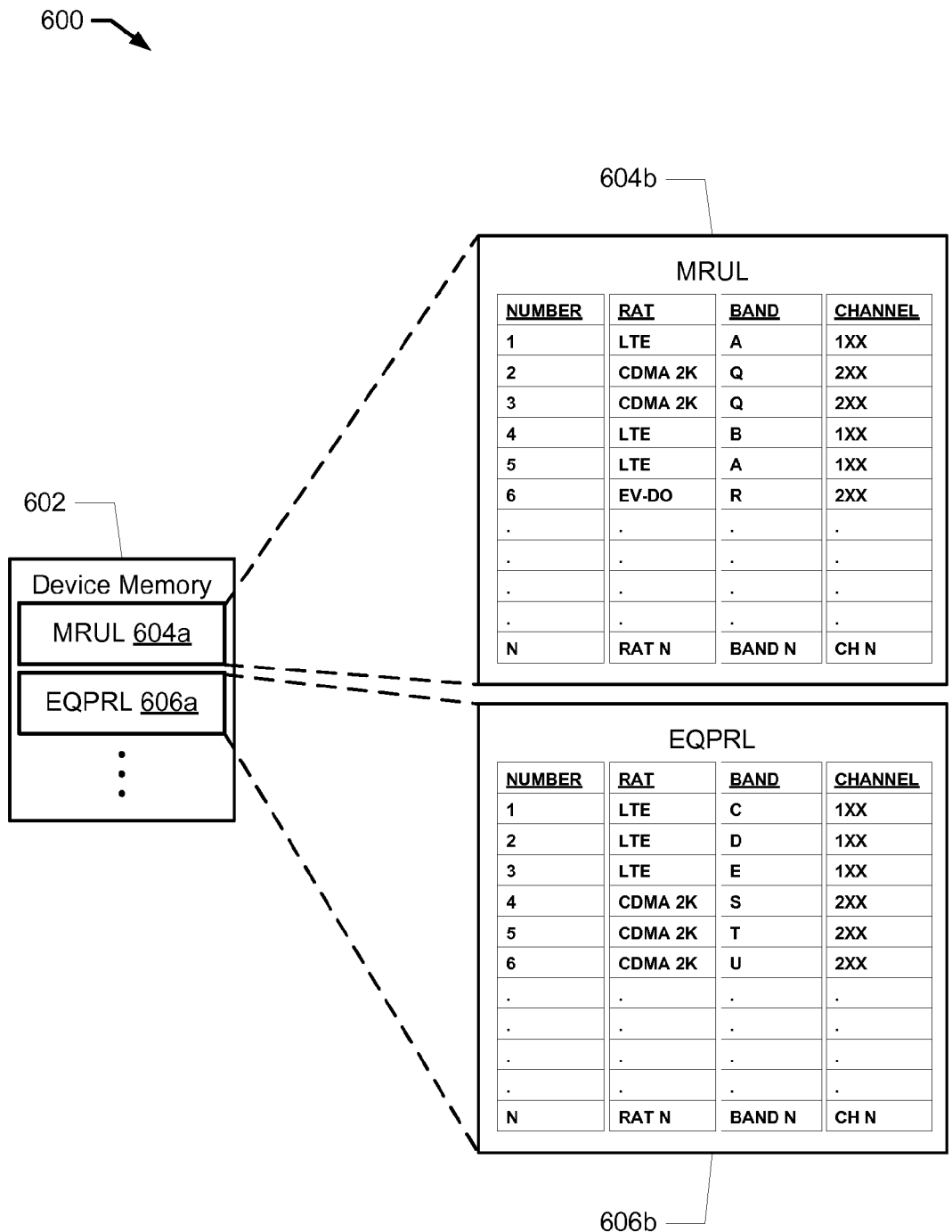
FIG. 6 illustrates a block diagram of a memory component of a wireless communication apparatus depicting the contents of both an MRUL and an EQPRL according to certain implementations of the disclosure.

FIG. 6 illustrates a block diagram of a device memory 602 of a wireless communication device 208, which may correspond to either of the device memories 210 or 306, which are respectively described above with respect to FIGS. 2 and 3. In some embodiments, the device memory 602 may include, but is not limited to, and MRUL 604*a* and an EQPRL 606*a*. Example contents for each of the MRUL 604*a* and an EQPRL 606*a* are depicted in exploded views of the MRUL 604*b* and an EQPRL 606*b*. In some embodiments, the MRUL 604*b* may include, but is not limited to, containing information associated with an ordered listing of most recently used carrier networks for a particular wireless communication device 208.

Amongst the MRUL 604*b* listing, information may be discriminated to include only relevant information for a carrier of the wireless communication device 208 that can be utilized to perform a quick scan or a rapid scan, as described further herein. Some of the information in the MRUL 604*b* may include RAT information, indicating whether a previously attached network was associated with a with a 4G LTE network, a 3G legacy network, or a 2G legacy network, frequency band information associated with the previously attached network, and/or channel information associated with previously attached communication channels utilized by the wireless communication device, while communicating via the carrier network.

In some embodiments, the EQPRL 604*b* may pertain to a 3GPP PLMN or a 3GPP2 PRL, either of which may include but is not limited to, containing information associated with an ordered listing of preferred roaming partner networks for a carrier of the wireless communication device 208. Amongst the EQPRL 604*b* listing, various included information may be utilized to perform extended and/or roaming network scans, as described further herein. Some of the information in the EQPRL 604*b* may include RAT information indicating whether a previously attached network was associated with a with a 4G LTE network, a 3G legacy network, or a 2G legacy network, frequency band information associated with the previously attached network, and/or channel information associated with previously attached communication channels utilized by the wireless communication device, while communicating via a roaming partner network.

FIG. 7 illustrates a flowchart according to an example method of a selective network reselection procedure 700 following a network detachment event according to some embodiments. It should be understood that any, or all of, the network reselection procedures 700 depicted in FIG. 7 may be associated with a method, or methods, that can be implemented by the execution of computer program instructions stored on a non-transitory computer-readable memory 210 of a wireless communication device 208, and optionally, in conjunction with the execution of computer program instructions stored on a non-transitory computer-readable memory of a network service provider controlling entity. Initially, at operation block 702 a wireless communication device 208 may attempt a rapid acquisition of a carrier network, e.g., by using its MRUL 604*a* which may be stored at a location within its device memory 602.

In some implementations, the rapid acquisition at block 702 may occur in response a network detachment event at the wireless communication device 208 that can be associated with a device sleep event, a device power savings mode event, etc. In some embodiments the network detachment event may correspond to the wireless communication device 208 entering into a radio resource control (RRC) Idle mode or the wireless communication device 208 entering into a discontinuous reception (DRX) Idle mode portion of an RRC Idle mode. In these scenarios, after the wireless communication device 208 exits the DRX Idle mode may initially attempt to reattach to the same network channel it was attached to, immediately preceding the Idle mode. Accordingly, the wireless communication device 208 may not perform a network scan to determine if the communication channel is available. Instead, the wireless communication device 208 can employ its network acquisition module 310 to resume communications using this familiar communication channel.

In a scenario where the wireless communication device 208 is unable to reacquire the same communication channel it had been using to communicate with prior to the network detachment event, the wireless communication device 208 may attempt the rapid acquisition of its carrier network in part by performing a network scan of specific carrier network bands A, B, Q, and R, at operation block 704, using network information stored in the MRUL 604*b*. The wireless communication device's MRUL 604*a* can include an abbreviated listing of one or more network systems to which the wireless communication device was most recently attached. These most recently used networks stored in the MRUL 604*b* may be discriminated by carrier, carrier frequency resource, channel, etc. In various implementations, the MRUL 604*a* can allow the network acquisition module 310 of the wireless communication device 208 to readily identify familiar carrier networks during a rapid frequency scan procedure.

By way of example, the wireless communication device 208 may utilize its network acquisition module 310 to identify one or more specific carrier network frequency bands, e.g., any of frequency bands A, B, Q, and R, to scan for during the rapid acquisition attempt 704. This limited frequency band scan could enable the wireless communication device 208 to readily attach to a preferred carrier network without wasting time by searching for auxiliary frequency bands, e.g., any of frequency bands C, D, E, S, T, and U, of roaming carriers during the initial rapid scan. In this manner, the requisite timing requirements for an associated MRUL 604a based search could be significantly reduced.

At decision block 706, a determination is made as to whether the rapid scan acquisition using the information MRUL 604b was successful. In a scenario where the wireless communication device 208 was able to detect a preferred carrier network during the rapid acquisition attempt, the wireless communication device 208 can attach to the preferred carrier network at operation block 708. However, in a scenario where the wireless communication device 208 was not able to detect a preferred carrier network during the rapid acquisition attempt, the wireless communication device 208 may attempt an extended acquisition of select frequency bands, e.g., any of frequency bands C, D, E, S, T, and U, of one or more roaming partner networks that are associated with (i.e., provider partners of) the carrier network for the wireless communication device 208 using information in the wireless communication device's 208 EQPRL 606b, at operation block 710.

In various embodiments, extended network scans may entail the wireless communication device 208 employing its network acquisition module 310 to scan for one or more roaming carrier network frequency bands, e.g., any of frequency bands C, D, E, S, T, and U, at operation block 710 using the EQPRL 606a. The extended network scan allows the wireless communication device 208 to connect to a backup network that may be associated with a preferred roaming partner of the carrier of the wireless communication device 208. At decision block 712 a determination is made as to whether the extended network scan is successful. When the extended scan is determined to be successful, then the wireless communication device 208 can attach to a preferred roaming network at operation block 714.

However, if the extended network acquisition is determined not to be successful, wireless communication device 208 may attempt to acquire other non-roaming partner networks in a subsequent alternate network acquisition attempt at operation block 716. As would be understood by those skilled in the art, acquiring non-roaming partner networks could be detrimental to a user of the wireless communication device 208, as these non-affiliated networks may charge exorbitant fees for providing roaming network access to parties that are not associated with roaming partner carriers.

The various aspects, embodiments, implementations or features of the described embodiments can be used separately or in any combination. Further, some aspects of the described embodiments may be implemented by software, hardware, or a combination of hardware and software. The described embodiments can also be embodied as computer program code stored on a non-transitory computer-readable medium. The computer readable-medium may be associated with any data storage device that can store data which can thereafter be read by a computer or a computer system. Examples of the computer-readable medium include read-only memory, random-access memory, CD-ROMs, HDDs, DVDs, magnetic tape, and optical data storage devices. The computer-readable medium can also be distributed over network-coupled computer systems so that the computer program code may be executed in a distributed fashion.

The foregoing description, for purposes of explanation, used specific nomenclature to provide a thorough understanding of the described embodiments. However, it will be apparent to one skilled in the art that some of the specific details are not required in order to practice the described embodiments. Thus, the foregoing descriptions of specific embodiments are presented herein for purposes of illustration and description. These descriptions are not intended to be exhaustive, all-inclusive, or to limit the described embodiments to the precise forms or details disclosed. It will be apparent to one of ordinary skill in the art that many modifications and variations are possible in view of the above teachings, without departing from the spirit and the scope of the disclosure.

What is claimed is:

1. A method for network reselection by a wireless communication device following a network detachment event, the method comprising:
    attempting an acquisition of a first network after the network detachment event;
    responsive to an unsuccessful attempt to acquire the first network, attempting an alternate network acquisition by scanning only one or more frequency bands allocated to a service provider of the wireless communication device, using a Most Recently Used List (MRUL) of the wireless communication device;
    determining whether the alternate network acquisition attempt was successful; and
    attaching to a second network based at least in part on the determination of whether the alternate network acquisition attempt was successful,
    wherein the wireless communication device filters the MRUL by frequency resource preferences of a carrier without regard to actual attachment ordering of most recently used networks of the wireless communication device to limit a number of frequency bands to scan during a quick scan.

2. The method of claim 1, wherein the network detachment event is associated with a sleep event of the wireless communication device or a power savings mode event of the wireless communication device.

3. The method of claim 1, wherein the first network is a wireless network to which the wireless communication device was most recently attached, immediately preceding the network detachment event.

4. The method of claim 1, wherein the MRUL comprises information about one or more frequency bands allocated to a primary service provider with which the wireless communication device is affiliated.

5. The method of claim 4, wherein the MRUL further comprises information about at least one radio access technology (RAT) of the primary service provider that indicates whether the first network or the second network is associated with a 4G long term evolution (LTE) network, a 3G legacy network, or a 2G legacy network.

6. The method of claim 4, wherein the alternate network acquisition using the MRUL comprises scanning only the one or more frequency bands allocated to the primary service provider of the wireless communication device before attaching to the second network, and
    wherein the second network is a wireless communication network of the primary service provider.

7. The method of claim 1, further comprising:
    determining whether the alternate network acquisition attempt is successful; and
    when the alternate network acquisition attempt is determined not to be successful, attempting a roaming network acquisition using an Equivalent Preferred Roaming List (EQPRL) that comprises information about one or more frequency bands allocated to each of a plurality of roaming service providers,
    wherein the one or more frequency bands allocated to each of the plurality of roaming service providers are different from the one or more frequency bands allocated to a primary service provider.

8. The method of claim 7, wherein the roaming network acquisition further comprises scanning the one or more frequency bands allocated to at least one roaming service provider of the plurality of roaming service providers before attaching to the second network,
wherein the second network is a wireless communication network of one of the plurality of roaming service providers.

9. A wireless communication device comprising:
at least one transceiver that is configured to communicate data via a first network and via a second network;
processing circuitry that is coupled to the at least one transceiver; and
at least one memory coupled to the processing circuitry,
wherein the processing circuitry is configured to execute computer program instructions to cause the wireless communication device to:
responsive to an unsuccessful attempt to acquire the first network, attempt an alternate network acquisition by scanning only one or more frequency bands allocated to a service provider of the wireless communication device; and
acquire the second network after detecting at least one communication channel associated with the one or more frequency bands allocated to the service provider,
wherein the one or more frequency bands allocated to the service provider of the wireless communication device are stored in a Most Recently Used List (MRUL) in the at least one memory of the wireless communication device,
wherein the wireless communication device filters the MRUL by frequency resource preferences of the service provider without regard to actual attachment ordering of most recently used networks of the wireless communication device to limit a number of frequency bands to scan during a quick scan.

10. The wireless communication device of claim 9, wherein the first network is a wireless network to which the wireless communication device was most recently attached, immediately preceding a network detachment event.

11. The wireless communication device of claim 10, wherein the network detachment event is associated with a sleep event of the wireless communication device or a power savings mode event of the wireless communication device.

12. The wireless communication device of claim 9, wherein the second network is a wireless network of the service provider of the wireless communication device.

13. The wireless communication device of claim 9, wherein the MRUL further comprises information about at least one radio access technology (RAT) of the service provider that indicates whether the first network or the second network is associated with a 4G long term evolution (LTE) network, a 3G legacy network, or a 2G legacy network.

14. A non-transitory computer-readable storage medium, storing a set of computer program instructions, that when executed by one or more processors of a wireless communication device, cause the wireless communication device to:
attempt an acquisition of a first network after a network detachment event, wherein the first network is a wireless network to which the wireless communication device was most recently attached, immediately preceding the network detachment event;
responsive to an unsuccessful attempt to acquire the first network, attempt an alternate network acquisition using a Most Recently Used List (MRUL) of the wireless communication device;
determine whether the alternate network acquisition attempt was successful;
attach to a second network based at least in part on the determination of whether the alternate network acquisition attempt was successful; and
when the alternate network acquisition attempt is determined not to be successful, attempt a roaming network acquisition using an Equivalent Preferred Roaming List (EQPRL) that comprises information about one or more frequency bands allocated to each of a plurality of roaming service providers, wherein the EQPRL comprises a Public Land Mobile Network and/or a Preferred Roaming List.

15. The non-transitory computer-readable storage medium of claim 14, wherein the network detachment event is associated with a sleep event of the wireless communication device or a power savings mode event of the wireless communication device.

16. The non-transitory computer-readable storage medium of claim 14, wherein the MRUL comprises information about one or more frequency bands allocated to a primary service provider with which the wireless communication device is affiliated, and
wherein the alternate network acquisition using the MRUL comprises scanning only the one or more frequency bands allocated to the primary service provider.

17. The non-transitory computer-readable storage medium of claim 14, wherein the roaming network acquisition further comprises scanning the one or more frequency bands allocated to at least one roaming service provider of the plurality of roaming service providers before attaching to the second network,
wherein the second network is a wireless communication network of one of the plurality of roaming service providers.

18. The non-transitory computer-readable storage medium of claim 14, wherein the MRUL further comprises information about at least one radio access technology (RAT) of a primary service provider that indicates whether the first network or the second network is associated with a 4G long term evolution (LTE) network, a 3G legacy network, or a 2G legacy network.

* * * * *